June 2, 1942.  H. E. GANTZER  2,285,267
CONTAINER HANDLING APPARATUS
Filed July 19, 1939  4 Sheets-Sheet 1
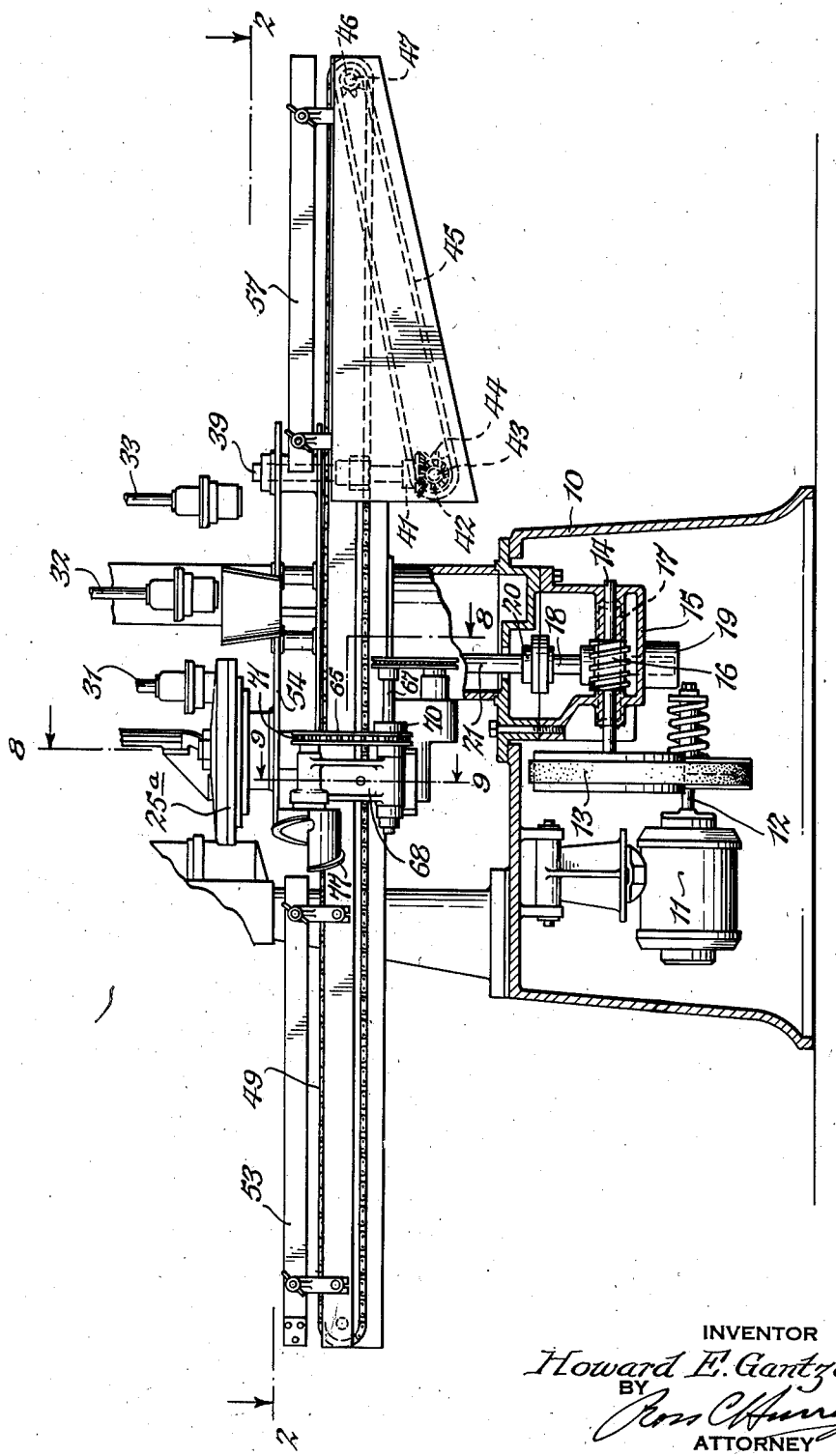
INVENTOR
Howard E. Gantzer
BY
ATTORNEY June 2, 1942.　　H. E. GANTZER　　2,285,267
CONTAINER HANDLING APPARATUS
Filed July 19, 1939　　4 Sheets—Sheet 2
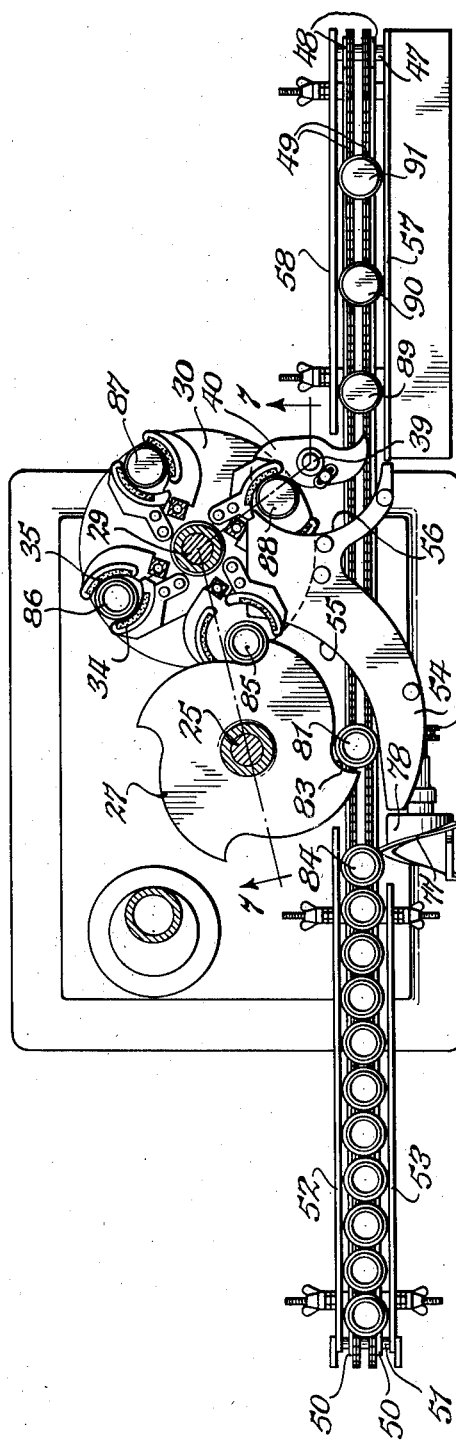
INVENTOR
Howard E. Gantzer
BY
Ross C. Hurry
ATTORNEY

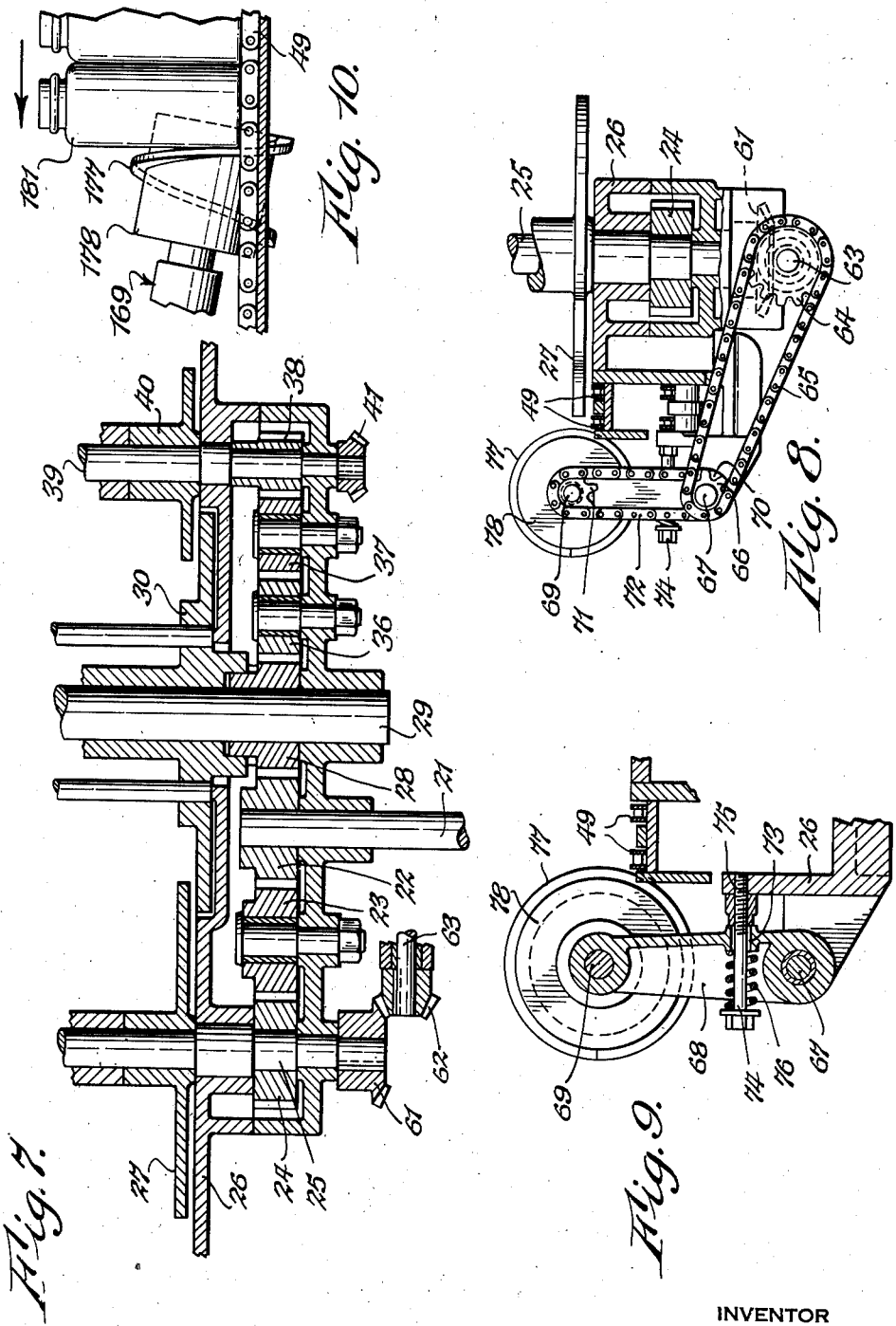

June 2, 1942.  H. E. GANTZER  2,285,267
CONTAINER HANDLING APPARATUS
Filed July 19, 1939   4 Sheets-Sheet 4
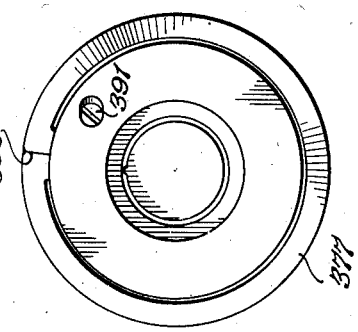
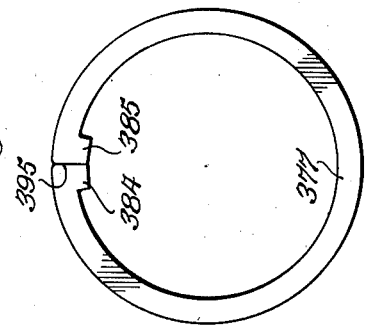
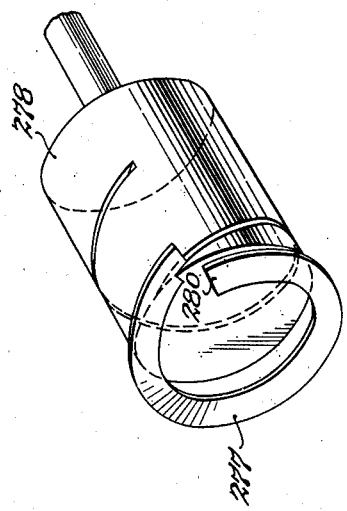
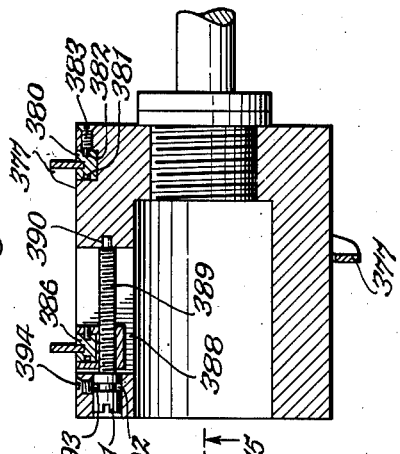
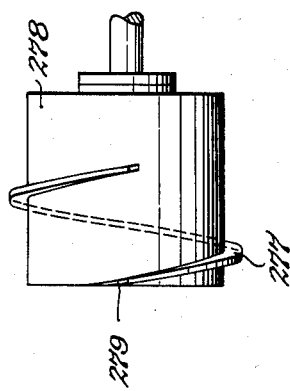
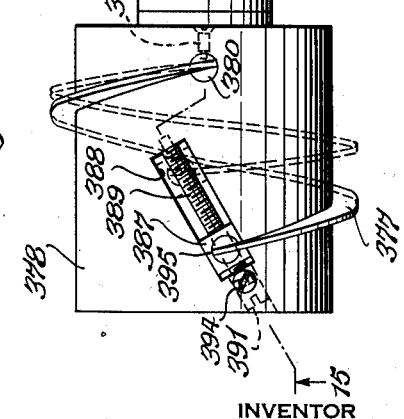
INVENTOR
Howard E. Gantzer
BY
Ross C. Hurney
ATTORNEY Patented June 2, 1942

2,285,267

UNITED STATES PATENT OFFICE 2,285,267

CONTAINER HANDLING APPARATUS

Howard E. Gantzer, Kenmore, N. Y., assignor to Consolidated Packaging Machinery Corporation, Buffalo, N. Y., a corporation of New York Application July 19, 1939, Serial No. 285,417

6 Claims. (Cl. 198—22)

My present invention relates to container handling apparatus and, more particularly, to improved means for accurately timing and spacing containers delivered by a conveyor.

My invention may be advantageously employed in connection with container-capping machines wherein it is desired to deliver containers at accurately timed intervals to a star wheel or other container-engaging device forming a part of a capping machine.

In the development of container-capping devices adapted for operation at extremely high speeds particular attention must be directed to the maintenance of a substantially continuous supply of containers in order that the full efficiency of the high speed machine may be realized.

It is an object of my invention to provide means for accumulating a substantial supply of containers and for delivering such containers to the capping machine at such intervals as to be smoothly and reliably engaged thereby.

It is a further object of my invention to provide means for individually releasing containers from an accumulated supply for movement at a speed commensurate with the speed of operation of container-engaging elements of a capping machine.

It is a further object of my invention to provide means for accumulating a constantly moving supply of containers from which containers may be individually released for travel at a relatively greater speed into engagement with operative elements of a capping machine.

It is a further object of my invention to provide means for moving objects at a predetermined rate of speed and to provide additional means for temporarily retarding the speed of such objects.

It is a further object of my invention to provide means for individual movement of objects at accurately spaced intervals.

My invention has for further objects such advantages in operation and use as may become more apparent from a consideration of the following specification.

More particularly, my invention contemplates the use of an intake conveyor to which containers may be supplied by any suitable means as, for example, another conveyor or by manual positioning. The intake conveyor is arranged in such relation to an operating station which may be provided with container engaging elements as to deliver containers into a position for engagement thereby. Preferably, the intake conveyor is driven at a speed commensurate with the speed of the operating station. Thus, a particular form of operating station will demand containers moving at a predetermined speed which is commensurate with the speed of the operating station. When the operating station comprises a notched star wheel and the conveyor is disposed tangentially thereto, it is preferable to drive the conveyor at such a speed that containers thereon will be moving at substantially the same speed which they must assume when engaged by the star wheel. In a high speed machine the speed of travel of the containers is necessarily relatively great and it has been found that sudden starting and stopping at such speed are likely to produce spillage or breakage of the containers. According to the present invention, I provide an intercepting means which is movable in the direction of travel of the conveyor at a speed less than the speed of the conveyor. Containers will be brought by the conveyor into abutment with this intercepting means and will be retarded thereby to a speed less than that of the conveyor. During such operation the conveyor will slide beneath the containers and will serve to bring additional containers up into contact with those thus retarded. Such operation will provide for accumulation of a substantial supply of successively engaging containers. The retarding means is arranged to individually release the successively leading containers for travel with the conveyor and at the speed of the conveyor into contact with the star wheel. Thus, individual containers will be released for travel at a relatively high speed and such speed will be assumed not from a stationary condition but from a condition in which the containers have been travelling at a reduced rate of speed. It will thus be seen that the containers are not subjected to extreme changes in speed. The retarding means may be driven in such manner as to release the containers at precisely the proper time for smooth and efficient engagement with the star wheel.

The following detailed description will set forth preferred forms of my invention in connection with its use in a container capping device. It is to be understood that such description is merely for the purposes of illustration and that the utility of my invention in varying applications will be apparent from a consideration of the following description taken in connection with the drawings accompanying and forming a part of the present specification.

In the drawings,

Fig. 1 is a broken elevational view of a container capping machine embodying my invention;

Fig. 2 is a sectional view taken along the line 2—2 of Fig. 1 showing the machine in a slightly different position from that illustrated in Fig. 1;

Figs. 3, 4, 5 and 6 are partial plan views similar to Fig. 2 and illustrating successive steps in the operation of my invention;

Fig. 7 is a sectional view taken along the irregular line 7—7 in Fig. 2;

Fig. 8 is a sectional view taken along the irregular line 8—8 in Fig. 1;

Fig. 9 is a sectional view taken along the line 9—9 of Fig. 1;

Fig. 10 is a detailed view illustrating a modification of my invention;

Fig. 11 is a detailed view illustrating another modification of my invention;

Fig. 12 is a view illustrating a method of assembly of a form of my invention shown in Fig. 11;

Fig. 13 is an end elevational view of a further modification of my invention;

Fig. 14 is a plan view of the form of the invention shown in Fig. 13;

Fig. 15 is a sectional view taken along the irregular line 15—15 of Fig. 14; and Fig. 16 is a detailed view of a part of the device illustrated in Figs. 13, 14 and 15.

Each of the sectional views in the drawings have been taken in the direction indicated by the arrows accompanying the section lines. Similar characters of reference indicate similar parts throughout the several views.

Referring now to the drawings,

In Fig. 1 I have shown a form of capping machine to which my invention may be adapted. The machine comprises in general a base 10 upon which the various elements of the machine may be mounted. Within the base 10 there is provided a suitable motor 11 having a drive shaft 12 which through a Reeves drive or other suitable power transmitting device 13 drives a shaft 14 mounted in suitable bearings within a gear case 15. The shaft 14 has fixed thereon a worm 16 which meshes with a worm wheel 17 fixed upon a vertical shaft 18 mounted for rotation in a suitable thrust bearing 19 carried by the gear case 15. The shaft 18 is connected through a suitable clutch 20 with a vertical shaft 21 which constitutes a main drive shaft of the machine.

Referring now to Fig. 7 the main shaft 21 carries at its upper end a gear 22 which meshes with an idler gear 23 which in turn meshes with a gear 24 fixed upon a vertical shaft 25 mounted for rotation in suitable bearings carried by a bed plate 26 of the capping machine. The shaft 25 extends above the bed plate and has fixed thereon a star wheel 27. The star wheel 27 may comprise upper and lower notched discs, the lower disc being shown in Fig. 7 while the upper disc is shown in plan in Fig. 2. To avoid confusion in the drawings the star wheel 27 has been omitted from Fig. 1. The star wheel shaft 25 may extend upwardly beyond the star wheel 27 and serve to drive a cap-supplying device indicated generally at 25a in Fig. 1.

The gear 22 on main drive shaft 21 further meshes with a gear 28 fixed upon a vertical shaft 29. The shaft 29 has mounted thereon a container engaging wheel 30 the lower disc of which is shown in Fig. 7 while the upper disc is shown in plan in Fig. 2. The container engaging wheel 30 has been omitted from Fig. 1. The shaft 29 extends upwardly to drive the cap applying chuck head which is not fully shown in the drawings but reference to Fig. 1 will disclose the cap applying chucks 31, 32 and 33 which are contained within such head. It will be understood that a cap applying chuck head of any suitable form may be used. In general, such head includes means driven by a shaft such as shaft 29 for rotating the chucks in a circular path and in positions overlying the container engaging elements of wheel 30. The chucks may be constructed for vertical movement in order to apply caps to containers held by the container engaging means. Particular forms of chuck heads are disclosed in Patents No. 1,754,461 granted April 15, 1930, to R. N. Cundall, No. 2,076,631 granted April 13, 1937, to Howard E. Gantzer and No. 2,116,068 granted May 3, 1938, to Howard E. Gantzer. Chuck heads of any of these patented types or variants thereof may be used in the present machine for cooperation with containers and caps of various types.

Referring to Fig. 2, it will be seen that the upper disc of the container engaging wheel 30 carries a plurality of clamping devices which comprise fixed jaws 34 and movable jaws 35. The cap applying chucks 31, 32 and 33 as well as the fourth chuck (not shown) will lie directly above containers gripped between the jaws 34 and 35 respectively. Reference is here made to Patent No. 1,754,461 for a disclosure of means therefor which may be used in the present machine.

Referring back to Fig. 7, the gear 28 on shaft 29 meshes with an idler gear 36 which in turn meshes with another idler gear 37 which finally engages a gear 38 fixed upon a vertical shaft 39 mounted for rotation within the bed plate structure. The shaft 39 carries at its upper end a discharge star wheel 40 which is arranged as shown in Fig. 2 to engage containers carried by the wheel 30 and to remove such containers therefrom and to position the same upon a conveyor. At its lower end the shaft 39 carries a bevelled gear 41 which serves to drive the conveyor now to be described.

Referring now to Fig. 1, the bevelled gear 41 meshes with a bevelled gear 42 on a stub shaft 43 upon which is mounted a sprocket 44. A sprocket chain 45 extends between the sprocket 44 and a sprocket 46 carried on a shaft 47 located at the extremity of an extended portion of the machine. A pair of sprockets 48 is carried by the shaft 47 (see Fig. 2) and serves to drive a pair of conveyor chains 49. The upper surfaces of the conveyor chains 49 are arranged generally within the plane of the top of the bed plate 26 and these chains extend across the machine in a position to lie substantially tangentially to the star wheel 27 and the discharge star wheel 40. The conveyor chains 49 extend leftwardly as viewed in Figs. 1 and 2 and pass over a pair of sprocket wheels 50 carried by an idler shaft 51 at the leftward extremity of the machine frame. The leftward end of the frame constitutes an intake end and in the normal operation of the machine the upper reaches of the chains 49 move to the right as viewed in Figs. 1 and 2. Suitable adjustable guide rails 52 and 53 are provided to maintain containers in alignment as they are advanced by the conveyor chains 49 along the intake end thereof.

A guiding device 54 is mounted above the plane of the bed plate 26. This guiding device may conveniently comprise a pair of spaced plate-like members disposed one above the other at a spacing generally commensurate with the vertical spacing between the upper and lower discs of the star wheel and container engaging wheel. As shown in Fig. 2, the guiding device 54 includes a curved guiding surface 55 which conforms generally to the circular path followed by containers engaged in the notches of the star wheel 27. The surface 55 thus serves to maintain the containers in proper position within the notches. In the normal operation of the machine the containers follow the thus described path into engaging position with the wheel 30 whereupon they are gripped by the engaging elements 34, 35 and are conducted around the circular path defined by the wheel 30. The guiding device 54 is provided with another guiding surface 56 disposed in the path of containers carried by the wheel 30. The surface 56 is preferably curved to conform to the path described by containers carried by the discharge star wheel 40. The clamping devices 34, 35 may be operated by suitable means, such as that shown in detail in Patent No. 1,754,461, to release the containers at the proper time for engagement thereby with the discharge star wheel 40 which sweeps the containers from the wheel 30 along the path defined by the surface 56 and upon the conveyor chains 49.

The containers deposited upon the conveyor chains 49 are carried thereby from the machine and suitable guides 57 and 58 may be provided to maintain the containers in alignment thereupon.

All of the mechanism above described has been described merely for the purpose of illustration of the operation of my invention. It is to be understood that the invention to be herein described is not in any sense limited to the particular form of capping machine thus described. The invention is of particular value in the machine thus described but is capable of use in combinations varying widely from such machine. The tangential relationship between the conveyor 49 and the star wheel 27 lends itself to smooth and efficient engagement of the leading container in a line thereof furnished by such conveyor. It will be appreciated, however, that the leading container should be accurately positioned upon the conveyor for shockless engagement by the star wheel notch. A particular advantage of the present invention is the provision for exact placement of the leading container for such smooth and shockless engagement.

According to the present invention, I provide a helical retarding device mounted for rotation in definite timed relation with the star wheel 27. This helical retarding device acts as an abutment constantly moving at a speed less than the lineal speed of the conveyor chains 49. The helical retarding device is so timed as to release a container for travel with the conveyor chains at the speed of the conveyor chains at precisely the proper moment for movement of the container into position for engagement by a star wheel notch. A preferred form of my invention comprises a single flight helix of one complete turn. The lead of the helix is preferably substantially equal to the width of a single container. Thus, the leading end of the helix may be interposed in the path of a container and retard its speed to that of the apparent movement of the helix during a single revolution of the helix. The trailing end of the helix will be withdrawn from the container at the proper timed moment whereupon the container will resume the speed of the conveyor. In the meantime, the next succeeding container will have been engaged by the leading end of the helix for similar control thereby. It will thus be seen that proper adjustment between the trailing end of the helix and the star wheel notch will result in smooth and shockless engagement of the container.

As shown in the drawings (Fig. 7), the vertical drive shaft 25 for the star wheel 27 has provided on its lower end a bevelled gear 61 which meshes with another gear 62 fixed upon a shaft 63. As shown in Fig. 8, the shaft 63 carries a sprocket 64 which, through a sprocket chain 65 and sprocket 66, drives a shaft 67 which is positioned to one side of and in a plane below the conveyor chains. The shaft 67 has freely pivoted thereon a generally vertical supporting arm 68 whose upper end serves as a bearing for a shaft 69. The shafts 67 and 69 are connected in driving relation by sprockets 70 and 71 and a sprocket chain 72. The arm 68 may thus swing about the shaft 67 without disturbing the driving relationship between the shaft 67 and the shaft 69.

As shown in Fig. 9, the arm 68 has a perforation 73 therein which loosely receives a screw 74 threaded at 75 to the frame 26 of the machine. A spring 76 is disposed between the head of the screw 74 and the arm 68. The spring 76 serves to yieldably maintain the arm 68 in the generally vertical position illustrated in the drawings.

The shaft 69 has fixed thereon the helical retarding means of my invention. As shown in Figs. 1 and 2, a helical ribbon 77 may be arranged upon a suitable mounting body as, for example, a portion of a cylinder 78. Preferably, the outer surface of the cylindrical wall of the body 78 forms a substantial continuation of the guiding surface of the rail 53 and the guiding surface 55 of the device 54. The helical ribbon 77 extends beyond the cylindrical body a distance sufficient to insure interception thereby of containers carried by the conveyor 49. As shown in the drawings, the helical ribbon 77 forms one complete turn and comprises a single flight. The leading end of the helical ribbon is indicated at 79 while the trailing end thereof is indicated at 80.

The mechanism thus described provides for rotation of the helical ribbon 77 from the same driving means as that provided for the star wheel 27. It is obvious that the angular relationship between the notches of the star wheel 27 and the ends 79 and 80 of the helical ribbon 77 may be varied at will. It is also obvious that proper selection of gears and sprocket sizes may be made in order to vary the relative speeds of rotation of the helical ribbon 77 and the star wheel 27. As heretofore described, the conveyor chains 49 are also driven by the same means provided for the star wheel 27. Preferably, the linear speed of the conveyor chains is substantially equal to the peripheral speed of the star wheel 27.

The provision for swinging of the support arm 68 and the provision of the spring 76 for maintaining the support arm in vertical position constitute a safety device which may be used if found desirable. It will be seen that in the event of improper engagement of the helical ribbon 77 with a container upon the conveyor 49, the arm 68 may swing in a counterclockwise direction as viewed in Figs. 8 and 9 against the force of the spring 76. Such action will avoid any possibility of breakage of the machine or of the container.

While I have described the ribbon 77 as helical and having a lead substantially equal to the width of a container, it is here pointed out that it need not be a true helix and that its lead may vary within limits. If the leading and trailing ends 79 and 80 respectively be upon the same generatrix of the surface of the cylindrical body 78, it is obvious that their effects upon successive containers will overlap and that the lead may consequently be greater than the width of a single container.

Referring now to Figs. 3, 4, 5, 6 and 2 in the order named, the operation of my invention will now be described.

In Fig. 3, a container 81 is shown in position upon the conveyor chains 49. The leading end 79 of the helical ribbon 77 has been rotated into a position in the path of the container 81. Since the speed of the conveyor chains is greater than the apparent speed of the helix during its rotation, the conveyor chains 49 will thereafter slip beneath the container 81 which is, of course, retarded to the speed permitted by the helix. A notch 82 in the star wheel 27 is shown approaching the conveyor chains and it will be understood that the star wheel 27 is rotating in a counterclockwise direction as viewed in this group of figures.

In Fig. 4, the helical ribbon 77 has been rotated approximately a half turn and the container 81 has progressed along the conveyor 49 a distance approximately equal to one half of the lead of the helical ribbon. The notch 82 has arrived at a substantially tangential relationship with the conveyor 49 but since no container is positioned for engagement thereby this notch will remain unfilled.

In Fig. 5, the helical ribbon 77 has rotated to such position that the trailing end 80 thereof is about to be retracted from the path of the container 81. A notch 83 of the star wheel 27 is shown approaching the conveyor 49. Continued rotation of the helical ribbon 77 from the position shown in Fig. 5 will result in release of the container 81 for travel with the conveyor 49. In the meantime, the leading end 79 of the helical ribbon has been interposed between the container 81 and the next succeeding container 84 and from this time the action of the container 84 will be similar to that described in connection with the container 81.

As shown in Fig. 6, the container 81 is travelling with the conveyor 49 and at the speed of the conveyor into engagement with the guiding surface 55 of the guiding device 54. The notch 83 and the container 81 are moving at substantially the same rate of speed and engagement of the container by the notch is about to occur. The succeeding container 84 is progressing along the conveyor 49 at the speed permitted by the advancement of the helical ribbon 77.

In Fig. 2, the container 81 is substantially in its final seated position within the notch 83.

It will thus be seen that selection of a conveyor speed properly commensurate to the peripheral speed of the star wheel 27 and proper timing of the helical ribbon 77 with the notches of the star wheel will result in a perfectly smooth and shockless engagement of the container by the star wheel notches. In the particular combination of a star wheel and a conveyor tangential thereto the conveyor speed may most advantageously be substantially equal to the peripheral speed of the star wheel. In other combinations the conveyor speed may be so commensurate to the speed of the container engaging operating station as to provide for desired engagement.

For purposes of illustration in Fig. 2, additional containers 85, 86, 87, 88, 89, etc. are shown as they progress through the machine in continuous operation thereof. The containers 89, 90 and 91 have been completely through the machine and have been placed upon the discharge end of the conveyor 49 by the discharge star wheel 40.

In the foregoing description of the operation of my invention I have dealt with the handling of a single container and some mention has been made of the operation upon the next succeeding container. The full value of my invention is not set forth in such limited description. Container capping devices, such as that herein illustrated, are normally associated in a production line with various other machines as, for example, filling, label pasting and other machines. The output of such other machines may be irregular. The container capping machine must be capable of absorbing such irregularities and capping the containers at such an average speed as to avoid accumulation or delay in the passage of containers through the production line. It is further apparent that there is no need for the capping machine to operate at a speed far in excess of the average output of the other machines with which it is associated. One of the primary advantages of my present invention is that it adapts the capping machine for continuous and efficient operation at almost any desirable speed. As above described, the conveyor chains 49 travel at substantially the same linear speed as the periphery of the star wheel 27. The particular star wheel chosen for illustration in the present description has four notches in its periphery. It is, therefore, apparent that four containers must be supplied for each revolution of the star wheel. If the containers are carried by the conveyor in a continuous successively contacting line, the supply thus maintained would be substantially in excess of the demand placed thereon by the star wheel. By the provision of the retarding means above described, I reduce the speed at which the containers travel for a relatively short period of time. This delay is such as to maintain a successive release of containers at such intervals as to exactly meet the demands of the star wheel. The tendency of the containers upon the intake conveyor 49 is to travel at the speed of the conveyor until retarded by the retarding means. Accordingly, containers at the intake end of the conveyor will be carried thereby into contact with the containers which have been retarded. The result will be an accumulation of a substantial number of containers, all of which are retarded to a speed less than that of the conveyor. This accumulated supply of retarded containers will obviously absorb rather extensive irregularities in the supply, the number of containers within the retarded group being more or less under varying circumstances.

When a container travelling at the speed of the conveyor 49 is brought into abutment with the retarding device or a container retarded thereby, the container will be reduced in speed in the illustrative mechanism above described to a speed approximately one quarter of that assumed while travelling with the conveyor. The actual change in speed is thus only 75% of the actual conveyor speed and, if this total change in speed is the maximum which may be safely imposed upon the container without danger of breakage or spillage, it is obvious that the actual conveyor speed may be 33⅓% greater than could be safely employed in any device wherein the containers are completely stopped. This 33⅓% increase in speed is, of course, useable throughout the machine and, accordingly, the actual output of the machine in number of capped containers delivered my actually be increased by 33⅓%. This increased speed of operation will be attained in varying degrees in capping devices of any design and irrespective of the number of notches in the star wheels thereof.

In Fig. 10 I have shown a modification of the particular manner of mounting the helical retarding device of the present invention. In this figure, a container 181 is illustrated as moving to the left upon the conveyor 49 as indicated by the arrow. A helical retarding device 177 is mounted upon a generally cylindrical body 178 whose axis indicated generally at 169 is inclined to the horizontal or to the plane of the conveyor 49 to such an extent that the portion of the helical ribbon 177 which contacts the containers will lie in approximately a vertical plane. This modification therefore provides for a relatively flat contact between the containers and the helical ribbon which will tend to reduce any danger of tipping of the container. This particular modification is of special value when the device of my invention is employed in a machine equipped to handle relatively large containers or containers which are substantially square and have only slightly rounded corners between which the ribbon may be interposed.

It is obvious that the particular construction of the helical retarding device may be modified to suit the convenience of a particular manufacturer. For the purposes of illustration I have shown in addition to the form illustrated in Figs. 1 to 9 inclusive certain modified forms. In Figs. 11 and 12 I show a cylindrical body 278 which may have cut therein a helical slot 279 of appropriate width and pitch. The helical ribbon 277 may be initially formed as a ring shaped blank of an internal diameter appropriately exceeding that of the internal diameter of the groove or slot 279. The external diameter of the blank may be chosen to provide for desired extension of the ribbon beyond the cylindrical body 278. The blank is cut as indicated at 280 and one end may be fed into the slot 279. This end is then fed progressively through the slot until the entire ring has been shaped into helical form as indicated in Fig. 11.

In Figs. 13 to 16 inclusive, I have illustrated a further modification which may be employed when a particular capping machine is called upon to handle containers of various sizes. In general, the modification illustrated in these figures provides for the adjustment of the lead of the helix. In these figures a cylindrical body 378 has freely rotatable therein a bearing member 380 whose axis is substantially radial of the cylindrical body and which is formed with an annular retaining groove 381 adapted to receive the tip 382 of a retaining screw 383. Preferably, the outer surface of the bearing member 380 lies substantially flush with the cylindrical surface of the member 378. The bearing member 380 is recessed in its outer surface to receive a tongue 384 formed upon one end of the helix blank 377 shown in detail in Fig. 16. The arrangement just described provides for rotation of the end of the helix 377 about an axis substantially radial to that of the cylindrical body 378. The internal diameter of the ribbon 377 is somewhat greater than the external diameter of the cylindrical body 378 and the opposite end of the ring is provided with a tongue 385 adapted for reception within a bearing member 386 similar to the bearing member 380.

The bearing member 386 is mounted for rotation within a block 387 mounted for sliding movement within an inclined slot 388 cut in the cylindrical body as shown in Fig. 14. The block 387 is formed with a threaded bore adapted to receive an elongated adjustment screw 389 arranged axially of the slot 388. The adjustment screw 389 may have a reduced bearing end 390 adapted for reception in an appropriate socket within the body 378. The head 391 of the adjustment screw 389 is preferably slotted for operation by a screwdriver and is located within an inclined bore formed in the cylindrical body 378. The head 391 is provided with an annular slot 392 which receives the tip 393 of a retaining screw 394. The adjustment screw is therefore mounted for rotation within the slot 388 and is retained against axial movement. It is obvious that rotation of the adjustment screw 389 will result in movement of the block 387 axially within the slot 388.

Since the tongue 385 of the ribbon 377 is carried by the block 387 it is apparent that movement of the block by the adjustment screw 389 will result in movement of the leading end 395 of the helix along the inclined path defined by the slot 388. The inclination of the slot 388 is preferably so chosen as to maintain the internal diameter of the ring 377 in close proximity to the internal surface of the cylindrical body 378 in any of the adjusted positions which may be assumed.

In Fig. 14 I have illustrated two substantially extreme positions of the adjustable helix 377. In full lines I have shown the helix adjusted to a condition of substantially maximum lead whereas in dotted lines I have shown the same adjusted to a condition of substantially minimum lead.

From the above detailed description it will be apparent that I have provided a construction which achieves the objects of my invention. The particular forms described are not necessarily the only forms as it is obvious that modifications and variations may be made by those skilled in the art within the scope of the appended claims. It is not my intention that the above detailed description should limit my invention, the scope of the invention being established solely by the following claims.

I claim:

1. In combination: means for advancing a series of articles; and means for bringing said articles into predetermined spaced relationship while continuing to be advanced by said advancing means comprising, an abutment having a helical surface, said abutment being mounted for rotation about an axis inclined to the path of said articles whereby said helical surface is presented in substantially flat abutting relation in the path of said articles, said helical surface describing substantially one complete helix and having a lead substantially equal to the width of each said article, and means to rotate said abutment at such a speed that said advancing means will continuously and successively propel said articles against said helical surface.

2. In combination: means for advancing a series of articles; and means for bringing said articles into predetermined spaced relationship while continuing to be advanced by said advancing means comprising, an abutment having a helical surface, said abutment being mounted for rotation about an axis inclined to the path of said articles whereby said helical surface is presented in substantially flat abutting relation in the path of said articles, and means to rotate said abutment at such a speed that said advancing means will continuously and successively propel said articles against said helical surface.

3. In combination: means for advancing a series of articles; and means for bringing said articles into predetermined spaced relationship while continuing to be advanced by said advancing means comprising, an abutment having a helical surface, said abutment being mounted for rotation about an axis inclined to the path of said articles whereby said helical surface is presented in substantially flat abutting relation in the path of said articles, said helical surface having a lead substantially equal to the width of each said article, and means to rotate said abutment at such a speed that said advancing means will continuously and successively propel said articles against said helical surface.

4. In combination; means for advancing a series of articles, and means for bringing said articles into predetermined spaced relationship while continuing to be advanced by said advancing means comprising an abutment having a helical surface, said abutment being mounted for rotation about an axis inclined to the path of said articles whereby said helical surface is presented in substantially flat abutting relation in the path of said articles, said helical surface having a lead substantially equal to the width of each article, means for varying the lead of said helical surface to render the same effective to function in connection with articles having widths different from the articles for which said helical surface was originally set, and means to rotate said abutment at such a speed that said advancing means will continuously and successively propel said articles against said helical surface.

5. A generally cylindriform body presenting a surface in the form of a helix, means for adjusting the lead of the helix comprising pivots for the ends of said helix, having axes radially disposed with respect to the axis of said cylindriform body and means for causing relative movement between said pivots in a path substantially normal to the angle of said helix whereby adjustment of the lead of said helix will be effected without distortion and without changing the diameter thereof.

6. An element for use in connection with object handling apparatus comprising a generally cylindriform body, a helical vane associated with the cylindriform surface of said body, means for pivotally mounting the ends of said vane on said body, and means for effecting relative movement between said pivotal mounting means in a path substantially normal to the angle of the helix whereby the lead of said helix may be varied.

HOWARD E. GANTZER.